(12) United States Patent
Kingman et al.

(10) Patent No.: US 11,347,096 B1
(45) Date of Patent: May 31, 2022

(54) LIGHT-CONTROL PANEL WITH LAYERED OPTICAL COMPONENTS

(71) Applicants: David E. Kingman, San Jose, CA (US); Donald R. Monroe, Los Gatos, CA (US); Peter F. Masschelein, Campbell, CA (US); Clarisse Mazuir, San Jose, CA (US)

(72) Inventors: David E. Kingman, San Jose, CA (US); Donald R. Monroe, Los Gatos, CA (US); Peter F. Masschelein, Campbell, CA (US); Clarisse Mazuir, San Jose, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 16/896,545

(22) Filed: Jun. 9, 2020

Related U.S. Application Data

(60) Provisional application No. 62/884,860, filed on Aug. 9, 2019.

(51) Int. Cl.
*G02F 1/1334* (2006.01)
*G02F 1/137* (2006.01)
*G02F 1/1333* (2006.01)
*G02F 1/1335* (2006.01)
*G02F 1/1362* (2006.01)

(52) U.S. Cl.
CPC ........ *G02F 1/1334* (2013.01); *G02F 1/13725* (2013.01); *G02F 1/136209* (2013.01); *G02F 1/133507* (2021.01)

(58) Field of Classification Search
CPC ............ G02F 1/1334; G02F 1/133607; G02F 1/133345; G02F 1/1323; G02F 1/133606; G02F 1/133611; G02F 1/133604; G02F 1/1333; G02F 1/133615; G02F 1/13475; G02F 1/133524; G02F 1/133528; G02F 1/133626; G02F 1/1336; G02F 1/1335; G02F 1/133504; G02F 1/133507; G02F 1/13356; G02F 1/137; G02F 1/13725; G02F 1/136209

See application file for complete search history.

(56) References Cited

U.S. PATENT DOCUMENTS

| | | |
|---|---|---|
| 6,466,298 B1 | 10/2002 | Fix et al. |
| 8,098,419 B2 | 1/2012 | Higashida et al. |
| 8,199,264 B2 | 6/2012 | Veerasamy |
| 9,927,673 B2 | 3/2018 | Chang et al. |

(Continued)

FOREIGN PATENT DOCUMENTS

CN 207301866 U 5/2018

*Primary Examiner* — Thoi V Duong
(74) *Attorney, Agent, or Firm* — Young Basile Hanlon & MacFarlane, P.C.

(57) ABSTRACT

Light-control panels including layered optical components are described in this application. An example of a light-control panel includes first, second, and third glazing layers, first and second switchable components extending between the first and second glazing layers, and a third switchable component extending between the second and third glazing layers. The switchable components include a polymer-dispersed liquid-crystal (PDLC) device having a clear state and a hazy state, a guest-host liquid-crystal (GHLC) device having a clear state and a tinted state, and a light-guide device having a clear state and a bright state.

20 Claims, 5 Drawing Sheets

(56) References Cited

U.S. PATENT DOCUMENTS

| | | | |
|---|---|---|---|
| 9,989,798 B2 * | 6/2018 | Kim | ............... G02F 1/1337 |
| 10,048,560 B1 | 8/2018 | Mazuir et al. | |
| 2018/0170013 A1 | 6/2018 | Hubert et al. | |
| 2020/0201093 A1 | 6/2020 | Yang et al. | |

* cited by examiner

LIGHT-CONTROL PANEL WITH LAYERED OPTICAL COMPONENTS

CROSS-REFERENCE TO RELATED APPLICATION(S)

This application claims the benefit of U.S. Provisional Application No. 62/884,860, filed on Aug. 9, 2019. The content of the foregoing application is incorporated herein by reference in its entirety for all purposes.

TECHNICAL FIELD

This disclosure relates generally to light-control panels and in particular to light-transmissive panels formed from laminated glass or glazings that use layered, complementary optical components to produce, scatter, guide, and block light transmission.

BACKGROUND

Panels or glazings, such as those made of glass, polycarbonate, plastic, composite, or other light-transmissive material, have optical properties that determine functionality of the panel, such as panel transmittance. Optical components, such as guest-host liquid-crystal (GHLC) films, polymer-dispersed or polymer-networked liquid-crystal (PDLC or PNLC) films, light-guide plates, and thermal coatings, can be used in laminated glass, glazings, or panels formed from other light-transmissive materials to selectively modify various optical properties of the panel, such as to selectively provide thermal shielding from radiation, single or bi-directional illumination, or tinting or scattering for privacy within a vehicle cabin or office, thus serving as various types of light-control panels.

SUMMARY

One aspect of the disclosed embodiments is a panel including first, second, and third glazing layers; a thermal coating extending between the first and second glazing layers; first and second switchable components extending between the second and third glazing layers; and a lamination layer extending between the first and second switchable components.

Another aspect of the disclosed embodiments is a panel including first, second, and third glazing layers; first and second switchable components extending between the first and second glazing layers; a lamination layer extending between the first and second switchable components; and a third switchable component extending between the second and third glazing layers.

Another aspect of the disclosed embodiments is a panel including first, second, third, and fourth glazing layers; a thermal coating extending between the first and second glazing layers; first and second switchable components extending between the second and third glazing layers; a lamination layer extending between the first and second switchable components; first and second low-reflective films spaced apart by a distance defined by an air gap and extending between the third and fourth glazing layers; a third switchable component extending between the third and fourth glazing layers; and another lamination layer extending between the third switchable component and one of the third and fourth glazing layers.

DETAILED DESCRIPTION

Light-control panels for use in vehicle cabins or office buildings can be formed from laminated glass or other light-transmissive materials layered with various optical components. Optical components can include thermal coatings, PDLC or PNLC films or devices, GHLC films or devices, suspended particle devices, electrochromic devices, light-guide devices, or other optical components that provide features such as adjustable tint or privacy, diffuse reflection, light scattering, thermal protection, and light guiding for in-glass illumination. The optical components can be included in a stack-up designed to optimize overall performance of the light-control panel while providing combinations of the described features. The term "optical component" is used to identify various portions of the light-control panel providing specified optical properties. Each optical component may be of singular, uniform construction or may alternatively comprise multiple sub-parts, layers, or other features that together to achieve the specified optical properties described for the given optical component.

Figure 1:
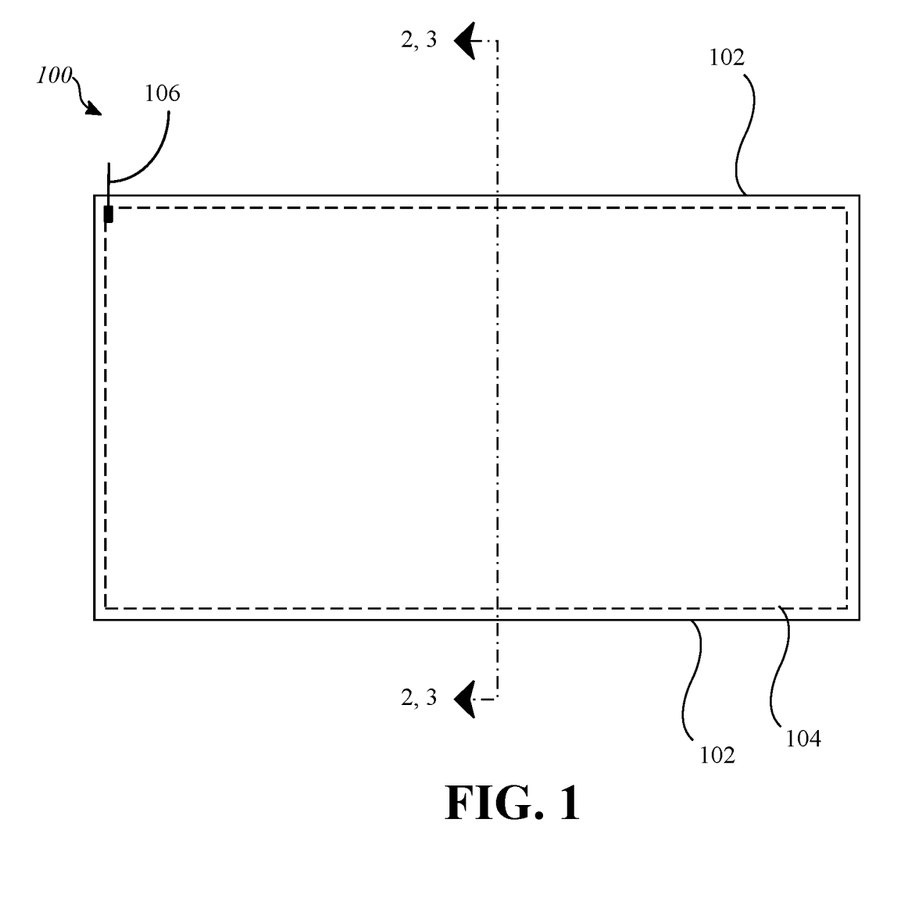
FIG. 1 is a plan view illustration showing a light-control panel.

FIG. 1 is a plan view illustration showing a laminated glazing or panel, designated generally as panel 100. The panel 100 may be used, for example, in a vehicle windshield, side window, sunroof, or backlight, or in another application, such as in building construction as an office window. The panel 100 can include various internal layers having optical properties, safety properties, and adhesive properties in various stack-ups further described below.

The panel 100 can have outer edges 102 and can include at least one switchable component 104 designated in dotted line to indicate its internal position within the panel 100. The term "switchable" is used to denote that a state change is possible for the component, such as between on and off states, between opaque and translucent states, between tinted and clear states, or between bright and dim states, for example. Other state types and changes between states for the at least one switchable component 104 are also possible. The at least one switchable component 104 can extend near or adjacent to the outer edges 102 of the panel 100 without reaching the outer edges 102 as shown. The switchable component 104 can also extend fully to the outer edges 102 of the panel 100. The panel 100 can include an edge treatment (not shown) suitable for allowing the panel to be held in a frame (not shown).

The panel 100 can include an electrical connection 106. The electrical connection 106 is connected to a power source and/or to a controller to provide electrical power and/or control signals to the at least one switchable component 104 that is incorporated into the panel 100. Electrical power and/or control signals passing through the electrical connection 106 to the at least one switchable component 104 can be used to modify a degree or direction of light transmission through the panel 100. For example, an amount of light transmitted through the panel 100 may be controllable by a voltage of a control signal delivered to the at least one switchable component 104 by the electrical connection 106, producing, for example, a tinting, darkening, or other change in opacity of the panel 100 as perceived by an occupant inside a vehicle or a pedestrian outside the vehicle. The electrical connection 106 may incorporate transparent electrodes, such as indium tin oxide (ITO) electrodes, to allow control of the variable light-transmissive properties of the at least one switchable component 104 within the panel 100.

Figure 2:
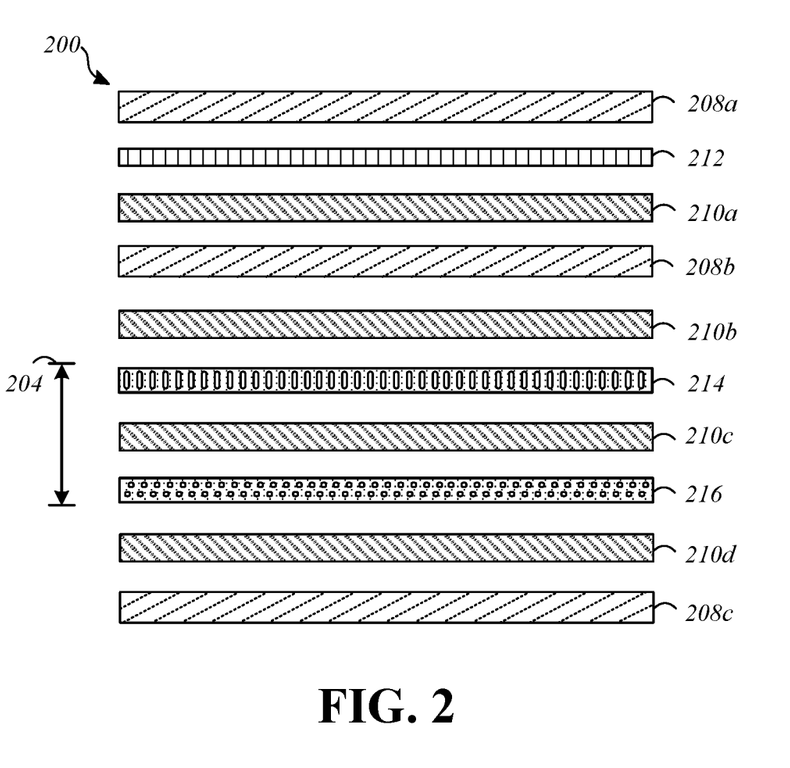
FIG. 2 is an exploded cross-sectional view of the panel of FIG. 1 taken along line 2-2 of FIG. 1 including layered optical components.

FIG. 2 is an exploded cross-sectional view of the panel 100 of FIG. 1 taken along line 2-2 of FIG. 1. For clarity, the cross-section in FIG. 2 will be described as panel 200. The panel 200 includes glazing layers 208a,b,c, (optional) lamination layers 210a,b,c,d, a thermal coating 212, and switchable components 204 that include a GHLC device 214 and a PDLC device 216 to provide thermal protection, adjustable tint, and light scattering features. The panel 200 is formed by stacking, sandwiching, layering, or otherwise combining optical components one on top of the other or one disposed within another, and when one layer or optical component is described as extending between other optical components or along another layer or optical component, its location within the stack-up is being described. The layers or optical components within the panel 200 may be co-extensive, or gaps or fillers may also be present to form the panel 200.

The glazing layers 208a,b,c include an outer glazing layer 208a, a central glazing layer 208b, and an inner glazing layer 208c. The outer glazing layer 208a serves as an outer surface of the panel 200, for example, in a position adjacent to an external environment. The central glazing layer 208b extends adjacent to the switchable components 204. The inner glazing layer 208c serves as an inner surface of the panel 200, for example, in a position adjacent to an interior of an office or a vehicle cabin. The glazing layers 208a,b,c can be formed from glass, acrylic, or other soda-lime or polycarbonate material. Other glazing materials are also possible, with the glazing materials generally being solid in form as well as having light-transmissive material properties. The glazing layers 208a,b,c can also have strength and safety properties, such as anti-shatter or bulletproof-type construction.

The (optional) lamination layers 210a,b,c,d can be used to adhere the various optical components in the panel 200 together. The lamination layers 210a,b,c,d can be formed from polyvinyl butyral (PVB), thermoplastic polyurethane (TPU), ethylene vinyl acetate (EVA), or other optically-clear adhesives (OCA) having low color indices that allow for high transparency. Other lamination materials are also possible, with the lamination materials generally having light-transmissive, heat-softening, and adhesive-bonding material properties. The various optical components of the panel 200 can be laminated in the described stack-ups using heat, pressure, and adhesion of the lamination layers 210a,b,c,d to the optical components according to a traditional lamination and curing process, for example, using vacuum bagging and autoclaving. Other lamination processes to adhere the optical components are also possible. Though the lamination layers 210a,b,c,d are shown as present between most of the optical components in the panel 200, some of the optical components may alternatively extend directly along or adjacent to other optical components should at least one of the co-extensive optical components have adhesive or bonding material properties. For example, either of the lamination layers 210b,d may be absent and replaced with an air gap (not shown). In this example, an adhesive is used along an outer perimeter of the glazing layers 208b,c to bond them together with the air gap (not shown) and the switchable components 204 extending between the glazing layers 208b, c.

The thermal coating 212 can be used to provide thermal protection using reflection and absorption. The thermal coating 212 can be a conductive coating with laser etching or a non-conductive coating that allows antenna signals such as radio signals to pass through the panel 200 while reflecting or absorbing solar radiation or other forms of heat. The use of a thermal coating 212 to reduce heat caused by solar radiation can both improve performance of the switchable components 204 embedded in the panel 200 and improve comfort for occupants in a vehicle cabin having laminated surfaces formed of the panel 200. The thermal coating 212 in the panel 200 is located directly below the outer glazing layer 208a to provide efficient heat reduction, providing thermal protection both to other optical components within the panel 200 and, for example, to occupants within a vehicle cabin using the panel 200.

The thermal coating 212 can also be used to provide diffuse reflection. Diffuse reflection can be a used as a cosmetic feature to provide a matte look or a mirror look when the panel 200 is viewed, for example, from a position in an external environment outside of a vehicle cabin, that is, outside of or above the panel 200 as shown. The cosmetic appearance of the panel 200 can be similar to that of anodized aluminum due to use of the thermal coating 212 while at the same time providing fully-clear and haze-free optical performance from a vantage point inside or on an interior side of the panel 200. In FIG. 2, diffuse reflection from a position above or outside of the panel 200 is achieved by locating the thermal coating 212 between the outer glazing layer 208a and the central glazing layer 208b of the panel 200.

Two switchable components 204, the GHLC device 214 and the PDLC device 216, are included in the panel 200 of FIG. 2. The GHLC device 214 can be used to provide adjustable tint by changing between a clear state (e.g. transparent) to a tinted state (e.g. shaded), where various levels of tint can be implemented based on activation of the GHLC device 214. GHLC technologies include, for example, inorganic particles or dichroic dyes having absorbing orientations and non-absorbing orientations along with liquid-crystal droplets dispersed in a polymer matrix that have optical axes that orient differently depending on whether an electric field is applied. Thus, the application of an electric field to liquid crystals dispersed in a polymer matrix along with a dichroic dye or inorganic particles allows an adjustment in an amount of light transmission through the GHLC device 214 to provide a change between the clear state and the tinted state for the panel 200 while retaining the ability to see through the panel 200. Other films, devices, or adjustable tint technologies can also be implemented in place of the GHLC device 214 to achieve similar tinting results. The GHLC device 214 in FIG. 2 is located between the central glazing layer 208b and the inner glazing layer 208c.

The PDLC device 216 can be used to provide haze or light scattering by changing between a clear state, without haze or scattering, to a hazy state (e.g. cloudy), where various levels of light scattering can be implemented based on deactivation of the PDLC device 216. PDLC technologies include, for example, films or substrates formed by curing emulsions formed of thirty to fifty percent polymer (or one to ten percent for PNLC technologies) with most of the remainder being liquid crystal. Droplets of liquid crystal separate from the polymer after curing in a randomized orientation that allows for a haze or scattering of light through the film or substrate. When an electric field is applied, the liquid crystal droplets reorient, reducing scattering and creating a transparent film or substrate. In additional to PDLC or PNLC technologies, transition between the clear state and the hazy state can be achieved using polymer-stabilized liquid-crystal (PSLC), holographic PDLC (H-PDLC), or other technologies to achieve similar haze or light-scattering results. The PDLC device 216 in FIG. 2 is also located between the central glazing layer 208b and the inner glazing layer 208c. The lamination layer 210c extends between the GHLC device 214 and the PDLC device 216.

Though the GHLC device 214 is shown as extending along (e.g. generally parallel and adjacent to) the central glazing layer 208b and the PDLC device 216 is shown as extending along the inner glazing layer 208c, the positions of the GHLC device 214 and the PDLC device 216 can be swapped, that is, can be interchanged in their order in the stack-up, in other embodiments without impacting tinting and hazing features of the panel 200. Various use cases and operational scenarios for activation and deactivation of the switchable components 204 of the panel 200 are described herein.

In one scenario where a vehicle including the switchable components 204 of the panel 200 is driving during a dark or gloomy day, both the GHLC device 214 and the PDLC device 216 can be operated in the clear states to allow a maximum amount of light to enter a vehicle cabin from an external environment. On the same dark or gloomy day, the GHLC device 214 can be operated in the clear state and the PDLC device 216 can be operated in the hazy state to allow light to enter the vehicle cabin while at the same time providing privacy since the light that enters the panel 200 is scattered in a manner that produces a hazy look to the panel 200.

In another scenario where a vehicle is driving during a bright and sunny day, and an occupant wants to dim a vehicle cabin, for example, to take a nap, the GHLC device 214 can be operated in the tinted state to reduce the amount of light entering the vehicle cabin from an external environment. On the same bright and sunny day, and if the occupant in the vehicle cabin also wants privacy, the PDLC device 216 can be operated in the hazy state while the GHLC device 214 is operated in the tinted state to both reduce the amount of light entering the vehicle cabin and obscure the occupant from view from a position outside of the vehicle.

In another scenario where a bright spot occurs, for example, based on the sun shining through a sunroof, side window, etc. of a vehicle cabin, the PDLC device 216 can be operated in the hazy state while the GHLC device 214 is operated in the clear state to retain the light source for the occupant while removing the bright spot since the bright spot can cause undesirable squinting or vision artifacts for the occupant in the vehicle cabin. This operational scenario is useful, for example, if the occupant is interested in reading a book or using electronic media in the presence of a light source but wants to avoid glare, reflection, etc. that is caused by the bright spot.

In another scenario where a vehicle is driving at night, and occupants inside a vehicle cabin are operating one or more light sources (such as cabin reading lights, electronic devices, etc.) inside the vehicle cabin, the PDLC device 216 can be operated in the hazy state to scatter light and provide privacy. In this scenario, the GHLC device 214 is operated in the clear state since operating the GHLC device 214 in the tinted state would still allow occupants in the vehicle cabin to be visible from a position outside of the vehicle cabin since the external environment generally remains darker than the lit vehicle cabin no matter the level of tint implemented.

To address additional scenarios or use cases, a vehicle can include multiple panels such as the panel 200, the multiple panels including the thermal coating 212 and the switchable components 204 being operated in different states in different panels. For example, a vehicle driving on a sunny day could include a roof panel with a GHLC device in a clear state and a PDLC device in a hazy state as well as side window panels with GHLC devices in a tinted state and PDLC devices in a clear state. In this example, a vehicle cabin would receive scattered light through the roof panel without bright spots, the occupants would be able to see through the tinted side window panels, and passersby would find it difficult to see through the side window panels given the sunny day environment, the tinted state of the GHLC device, and the reflective properties of the thermal coatings in the side window panels.

Figure 3:
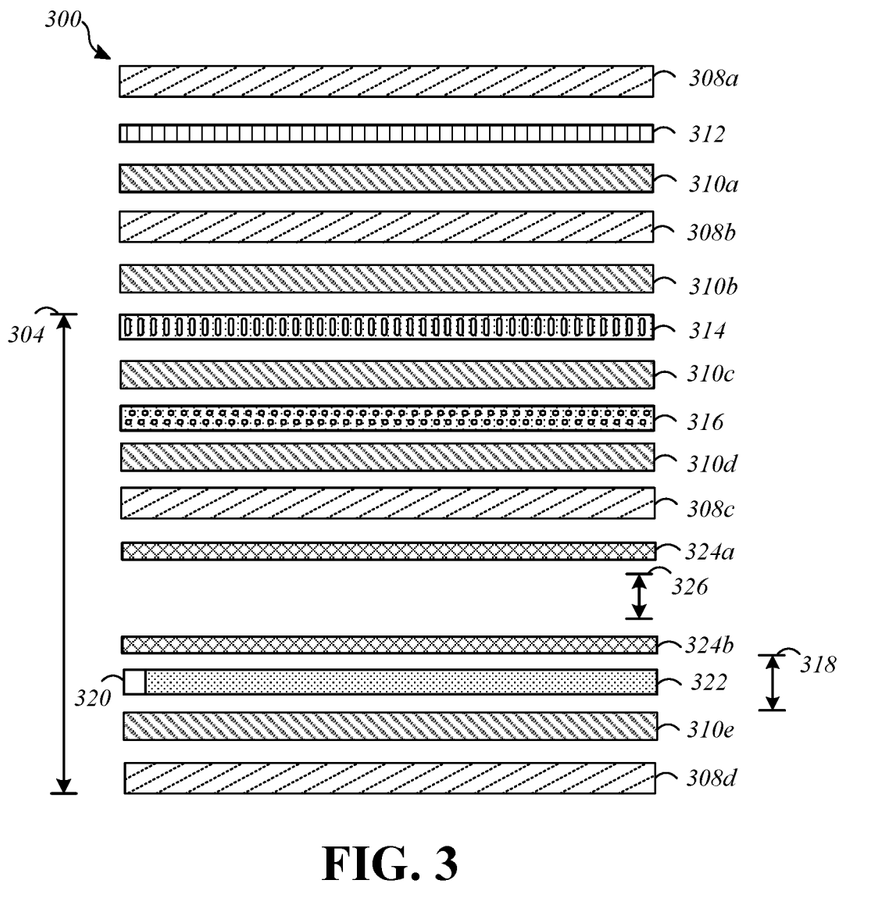
FIG. 3 is an exploded cross-sectional view of the panel of FIG. 1 taken along line 3-3 of FIG. 1 including layered optical components.

FIG. 3 is an exploded cross-sectional view of the panel 100 of FIG. 1 taken along line 3-3 of FIG. 1. For clarity, the cross-section in FIG. 3 will be described as panel 300. The panel 300 includes glazing layers 308a,b,c,d, (optional) lamination layers 310a,b,c,d,e, a thermal coating 312, and switchable components 304 that include a GHLC device 314, a PDLC device 316, and a light-guide device 318 to provide thermal protection, adjustable tint, light scattering, and in-glass lighting features.

Many of the optical components of the panel 300 have functions and combinations similar to those described in reference to the panel 200 of FIG. 2. That is, the thermal coating 312, the GHLC device 314, and the PDLC device 316 provide thermal protection, adjustable tint, and haze-based privacy, respectively, in a manner similar to that described in respect to the panel 200 of FIG. 2. Additional similarities between the panel 200 of FIG. 2 and the panel 300 of FIG. 3 are not described or are described only briefly for the sake of brevity. Some aspects of the panel 300 in FIG. 3 differ from the panel 200 in FIG. 2, and these differences are further described herein.

One difference between the panel 300 and the panel 200 is the addition of the light-guide device 318. The light-guide device 318 in the panel 300 of FIG. 3 includes a light source 320 and a light-guide plate 322. The light-guide device 318 can be used to provide an in-glass lighting feature by changing between a clear state (e.g., without light emission) to a bright state (e.g. illuminated), where various amounts of light can be emitted from the panel 300 based on activation of the light-guide device 318. For example, light emitted by the light source 320 can be extracted by the light-guide plate 322 to create a distributed, surface-based light source for use in a vehicle cabin or office when the light-guide device 318 is in the bright state. The lamination layer 310e extends between the light-guide device 318 and the glazing layer 308d such that the glazing layers 308c,d surround the light-guide device 318 and protect it from interference from the external environment. Other structures or optical components can also be used to form the light-guide device 318.

The panel 300 also includes a pair of low-reflective films 324a,b that surround an air gap 326 having a height or distance that separates the low-reflective films 324a,b. The low-reflective films 324a,b mitigate visible reflections at surfaces of the glazing layers 308c,d on either side of the air gap 326. The air gap 326 can improve noise-vibration-harshness (NVH) performance of the panel 300, for example, by partially isolating a vehicle cabin or an interior of an office from noise generated at a location outside a top or upper portion of the panel 300 (i.e., above the glazing layer 308a). The air gap 326 can be formed between the glazing layers 308c,d in the panel 300 as shown by using spacers (not shown) adhered to perimeters of the glazing layers 308c,d. In another embodiment (not shown), the glazing layer 308c can be absent, and the low-reflective film 324a can be laminated to the PDLC device 316, using, for example, the lamination layer 310d.

The air gap 326 can also reduce a thermal load on a bottom or lower portion of the panel 300 (i.e., below the glazing layer 308c) by using air to isolate the vehicle cabin or interior of the office from solar radiation as well as from heat generated by the GHLC device 314 and the PDLC device 316. This keeps the bottom or lower portion of the panel 300 cooler to the touch, for example, when used as a sunroof or window for a vehicle cabin or a window or wall for an office, than would be the case without the air gap 326.

Another difference between the panel 200 of FIG. 2 and the panel 300 of FIG. 3 is in the importance of the position of the switchable components 304. The GHLC device 314 is shown as extending along (e.g. generally parallel and adjacent to) the glazing layer 308b and the PDLC device 316 is shown as extending along the glazing layer 308c. The positions of the GHLC device 314 and the PDLC device 316 can be swapped in other embodiments without impacting tinting and hazing features of the panel 300. The light-guide device 318 is shown as extending between the glazing layers 308c,d in a position that is interior to the GHLC device 314 and the PDLC device 316. In other words, the light-guide device 318 is in a position closer to, for example, occupants in a vehicle cabin, than the other switchable components 304. The position of the light-guide device 318 is important in respect to the GHLC device 314 and the PDLC device 316. When the light-guide device 318 is in the bright state to provide a light source for a vehicle cabin, the GHLC device 314 or the PDLC device 316 (or both) can be used to shield an external environment from the light emitted by the light-guide device 318 and provide privacy to the vehicle cabin. Additional use cases and operational scenarios for the various switchable components 304 are described herein.

In one scenario where a vehicle is driving on a dark or gloomy day or at night, and the panel 300 including the switchable components 304 is located in a roof of the vehicle, the GHLC device 314 can be operated in the tint state, the PDLC device 316 can be operated in the hazy state, and the light-guide device 318 can be operated in the bright state to provide additional light to occupants within the vehicle cabin, reduce the amount of light visible to passersby in an external environment, and provide privacy to the occupants within the vehicle cabin. In this same vehicle, the panel 200 of FIG. 2 can be used in side windows of the vehicle such that the GHLC device 214 is in the tinted state and the PDLC device 216 is in the hazy state, ensuring vehicle cabin privacy and reduction of light exiting the vehicle cabin.

In another scenario where a vehicle is driving on a mixed sunny and cloudy day, and the panel 300 including the switchable components 304 is located in a roof of the vehicle, the GHLC device 314 can be operated in the clear state, the PDLC device 316 can be operated in the hazy state, and the light-guide device 318 can be operated in the bright state to provide more consistent, bright-spot free lighting to occupants within the vehicle cabin without a roof-based privacy feature. In this same vehicle, the panel 200 can be used in side windows of the vehicle with the GHLC device 214 in the tinted state if light-leakage is to be avoided and the PDLC device 216 in the hazy state is privacy is desired.

Other operational scenarios and panel combinations leveraging the switchable components 204, 304 described in FIGS. 2 and 3 are also possible. Changes in operational state of the described switchable components 204, 304 can be based on input from sensors (e.g., sensing ambient light levels, light intensity, etc.), user-profile settings or preferences for lighting and privacy, or user inputs or requests to a user interface, for example, within a vehicle cabin.

Figure 4:
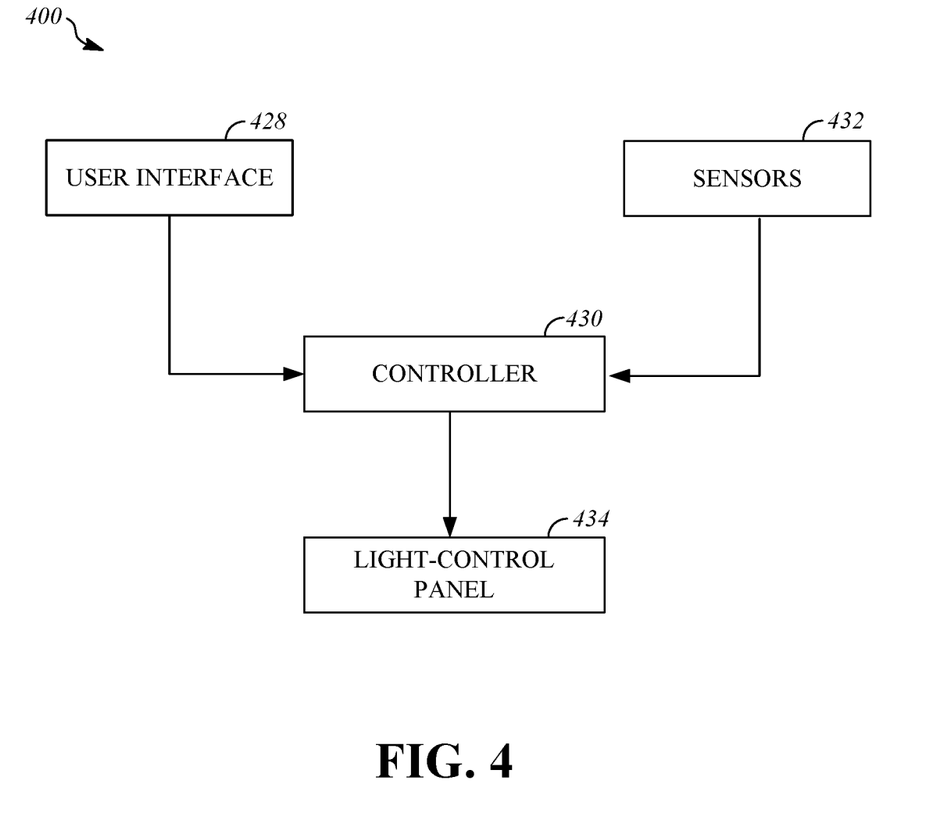
FIG. 4 is a block diagram that shows a panel control system.

FIG. 4 is a block diagram that shows a panel system 400. The panel system 400 can include a user interface 428, a controller 430, sensors 432, and a light-control panel 434 similar to the panels 100, 200, 300 described in reference to FIGS. 1-3.

The user interface 428 allows a user to modify aspects of the operation of the panel system 400 and to set a desired state for the panel system 400, such as a state of illumination, privacy, or transparency associated with the light-control panel 434. That it, the user interface 428 can allow modification of operating parameters of the light-control panel 434, for example, based on user preferences.

The controller 430 coordinates operation of the panel system 400 by communicating electronically (e.g., using wired or wireless communications) with the user interface 428, the sensors 432, and the light-control panel 434. The controller 430 may receive information (e.g., signals and/or data) from the user interface 428, from the sensors 432, and/or from other portions (not shown) of the panel system 400.

The sensors 432 may capture or receive information related, for example, to an external environment where the panel system 400 is located. The external environment can be an exterior or an interior of a vehicle or an office, and information captured or received by the sensors 432 can relate to weather, such as a presence of rain or sunshine, or lighting conditions, such as a use of lighting by occupants within the vehicle or the office or an absence of sunlight exterior to a vehicle.

The panel system 400 can change an amount of light transmission by or through the light-control panel 434 based on a control signal, such as a signal from the controller 430. The control signal may cause the light-control panel 434 to modify a current light transmission characteristic, for example, from a first light transmission value to a second light transmission value that is different than the first light transmission value, or from a light transmitting state to a light blocking, scattering, or reflecting (mirror) state. Technologies that may be used to implement the light-control panel 434 include switchable components such as light-guide devices, suspended-particle devices, electrochromic devices, PDLC devices, PNLC devices, PSLC devices, H-PDLC devices, and GHLC devices.

Figure 5:
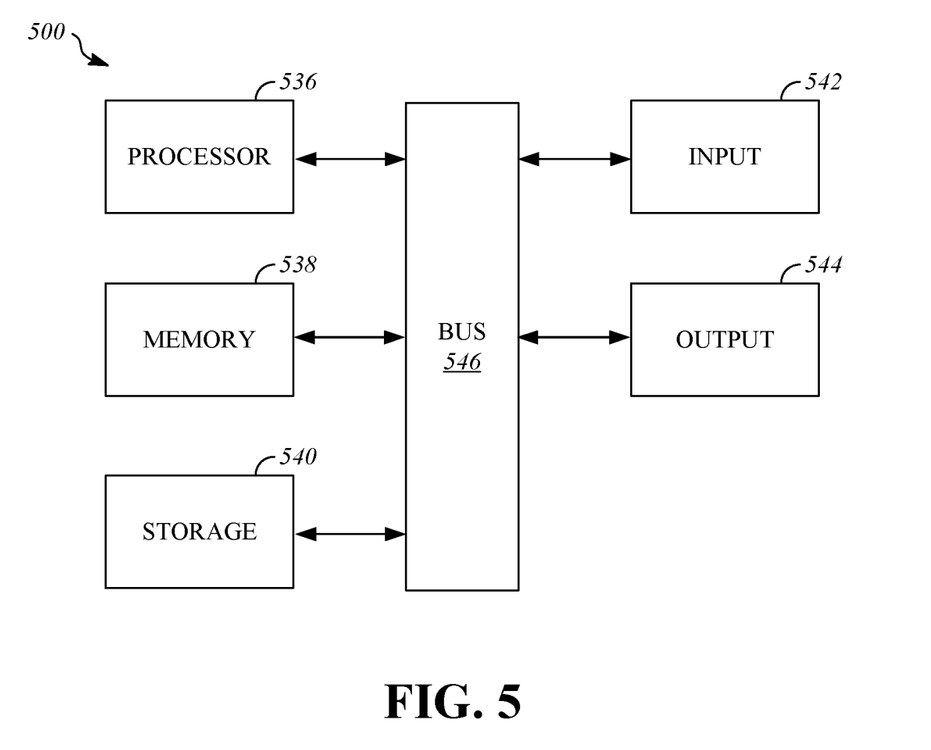
FIG. 5 is an illustration showing an example of a hardware configuration for a controller.

FIG. 5 shows an example of a hardware configuration for a controller 500 that may be used to implement the controller 430 and/or other portions of the panel system 400. In the illustrated example, the controller 500 includes a processor 536, a memory device 538, a storage device 540, one or more input devices 542, and one or more output devices 544. These components may be interconnected by hardware such as a bus 546 that allows communication between the components.

The processor 536 may be a conventional device such as a central processing unit and is operable to execute computer program instructions and perform operations described by the computer program instructions. The memory device 538 may be a volatile, high-speed, short-term information storage device such as a random-access memory module. The storage device 540 may be a non-volatile information storage device such as a hard drive or a solid-state drive. The input devices 542 may include sensors and/or any type of human-machine interface, such as buttons, switches, a keyboard, a mouse, a touchscreen input device, a gestural input device, or an audio input device. The output devices 544 may include any type of device operable to provide an indication to a user regarding an operating state, such as a display screen, a light-control panel, or an audio output.

As described above, one aspect of the present technology is the gathering and use of data available from various sources, such as from sensors 432 or user profiles, to improve the function of light-control panels such as the panels 100, 200, 300. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to light-transmission through light-control panels to best match user lighting preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based light transmission through a light-control panel, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in light transmission through light-control panels can be implemented for a given user by inferring user preferences based on non-personal information data, a bare minimum amount of personal information, other non-personal information available to the device, or publicly available information.

What is claimed is:

1. A panel, comprising:
    first, second, and third glazing layers;
    a thermal coating extending between the first and second glazing layers;
    first and second switchable components extending between the second and third glazing layers;
    first and second low-reflective films extending between the first and second switchable components and spaced apart a distance defined by an air gap; and
    a lamination layer extending between the first and second switchable components.

2. The panel of claim 1, wherein the first switchable component is a polymer-dispersed liquid-crystal (PDLC) device having a clear state associated with transparency and a hazy state associated with cloudiness.

3. The panel of claim 2, wherein the second switchable component is a light-guide device having a clear state without light emission and a bright state associated with light emission.

4. The panel of claim 2, wherein the second switchable component is a guest-host liquid-crystal (GHLC) device having a clear state associated with transparency and a tinted state associated with shading.

5. The panel of claim 4, wherein the first switchable component extends along the second glazing layer and the second switchable component extends along the third glazing layer.

6. The panel of claim 4, comprising:
a third switchable component that extends along the third glazing layer, wherein the first switchable component extends along the second glazing layer, and wherein the second switchable component extends between the first switchable component and the third switchable component.

7. The panel of claim 6, wherein the third switchable component is a light-guide device having a clear state without light emission and a bright state associated with light emission.

8. The panel of claim 1, comprising:
a fourth glazing layer extending between one of the first and second low-reflective films and the lamination layer.

9. A panel, comprising:
first, second, and third glazing layers;
first and second switchable components extending between the first and second glazing layers;
a lamination layer extending between the first and second switchable components;
first and second low-reflective films extending between the second and third glazing layers and spaced apart a distance defined by an air gap; and
a third switchable component extending between the second and third glazing layers.

10. The panel of claim 9, wherein the first switchable component is one of a polymer-dispersed liquid-crystal (PDLC) device having a clear state and a hazy state and a guest-host liquid-crystal (GHLC) device having a clear state and a tinted state.

11. The panel of claim 10, wherein the second switchable component is the other of the PDLC device and the GHLC device.

12. The panel of claim 11, wherein the third switchable component is a light-guide device having a clear state and a bright state.

13. The panel of claim 9, comprising:
a fourth glazing layer extending along the first glazing layer;
a thermal coating extending between the first and fourth glazing layer; and
another lamination layer extending between the thermal coating and the first or the fourth glazing layer.

14. The panel of claim 9, comprising:
additional lamination layers, one extending between the first glazing layer and the first switchable component and another extending between the second switchable component and the second glazing layer.

15. A panel, comprising:
first, second, third, and fourth glazing layers;
a thermal coating extending between the first and second glazing layers;
first and second switchable components extending between the second and third glazing layers;
a lamination layer extending between the first and second switchable components;
first and second low-reflective films spaced apart by a distance defined by an air gap and extending between the third and fourth glazing layers;
a third switchable component extending between the third and fourth glazing layers; and
another lamination layer extending between the third switchable component and one of the third and fourth glazing layers.

16. The panel of claim 15, wherein the first switchable component is a polymer-dispersed liquid-crystal (PDLC) device having a clear state and a hazy state.

17. The panel of claim 16, wherein the second switchable component is a guest-host liquid-crystal (GHLC) device having a clear state and a tinted state.

18. The panel of claim 17, wherein the third switchable component is a light-guide device having a clear state and a bright state.

19. The panel of claim 15, wherein the first switchable component extends along the second glazing layer, wherein the second switchable component extends along the third glazing layer, wherein the first low-reflective film extends along the third glazing layer, and wherein the third switchable component extends along the fourth glazing layer.

20. The panel of claim 19, comprising:
another lamination layer extending between the thermal coating and one of the first and second glazing layers;
another lamination layer extending between the second glazing layer and the first switchable component; and
another lamination layer extending between the second switchable component and the third glazing layer.

* * * * *